2,997,313
MOTOR VEHICLE FRAME STRUCTURE
Thomas J. Wall, Detroit, Mich., assignor to Chrysler Corporation, Highland Park, Mich., a corporation of Delaware
Filed Sept. 3, 1959, Ser. No. 837,928
11 Claims. (Cl. 280—106.5)

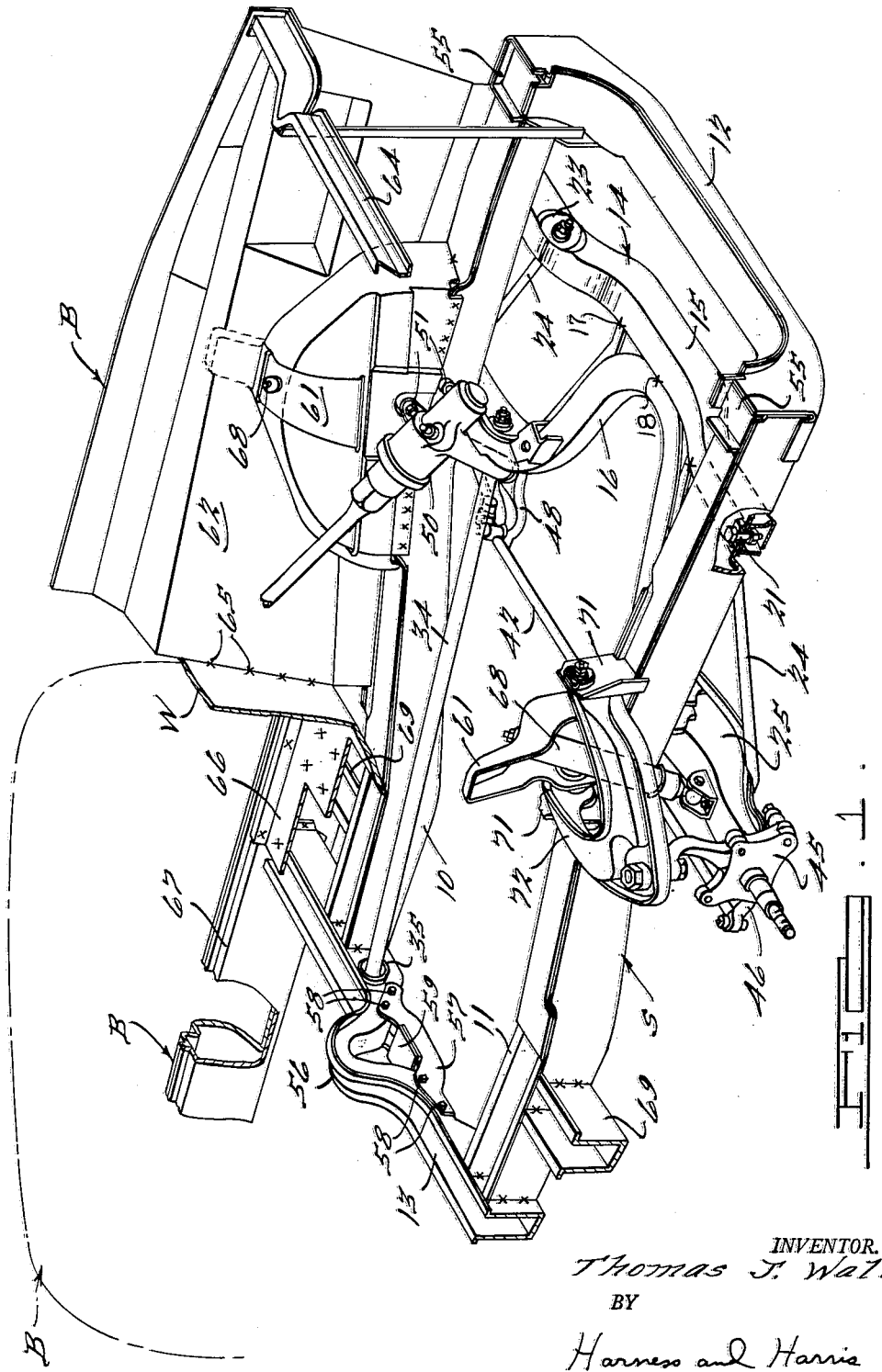

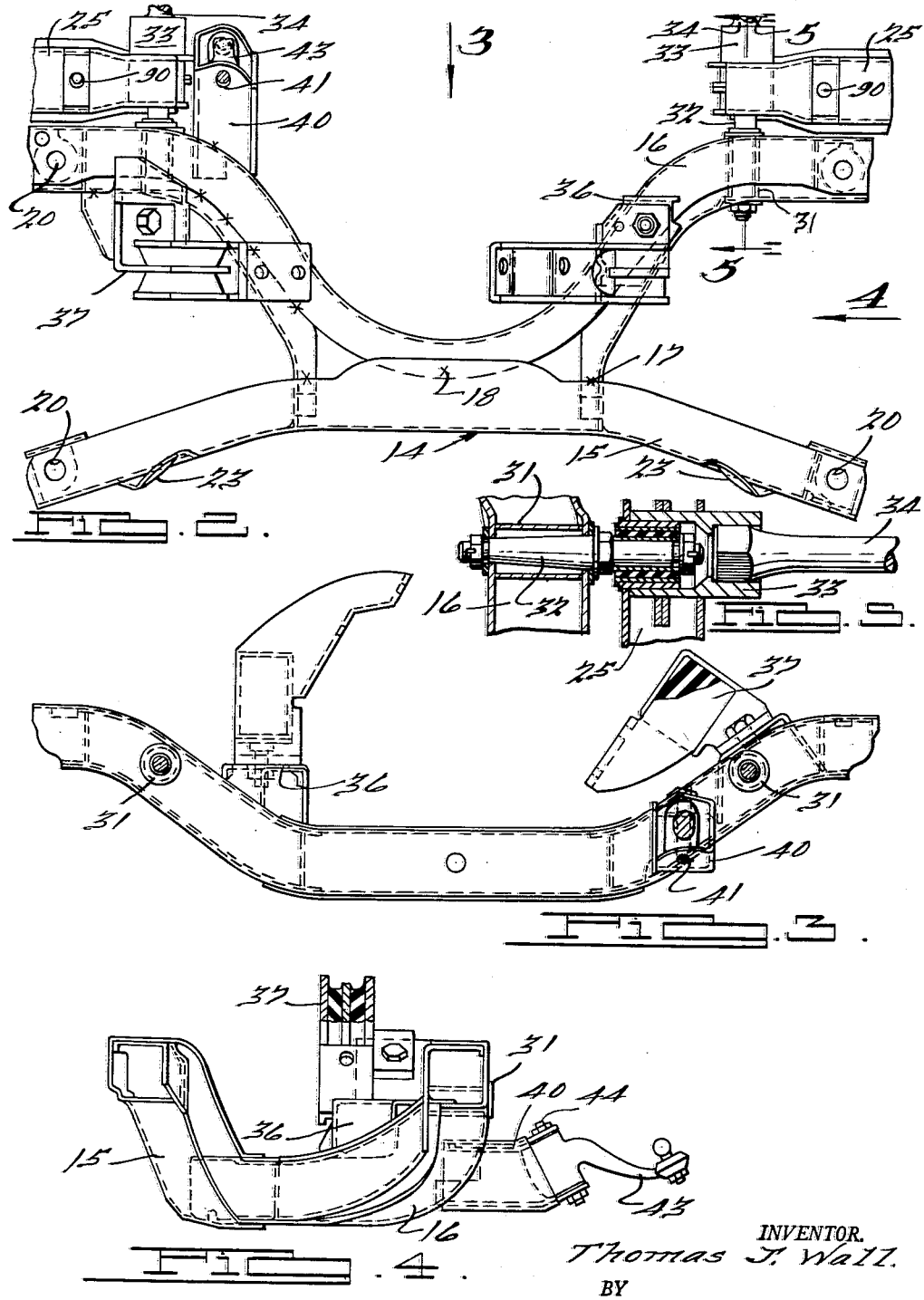

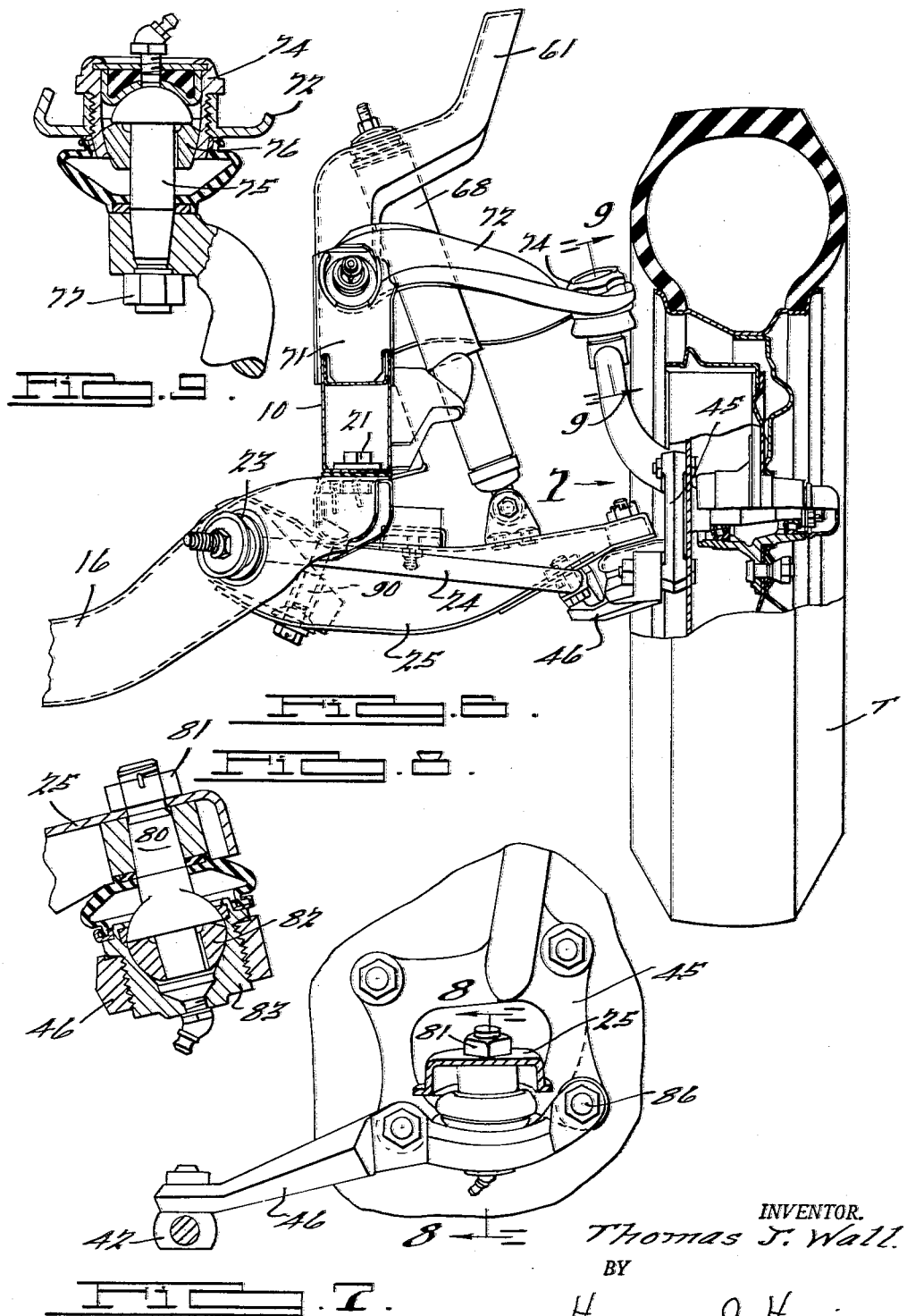

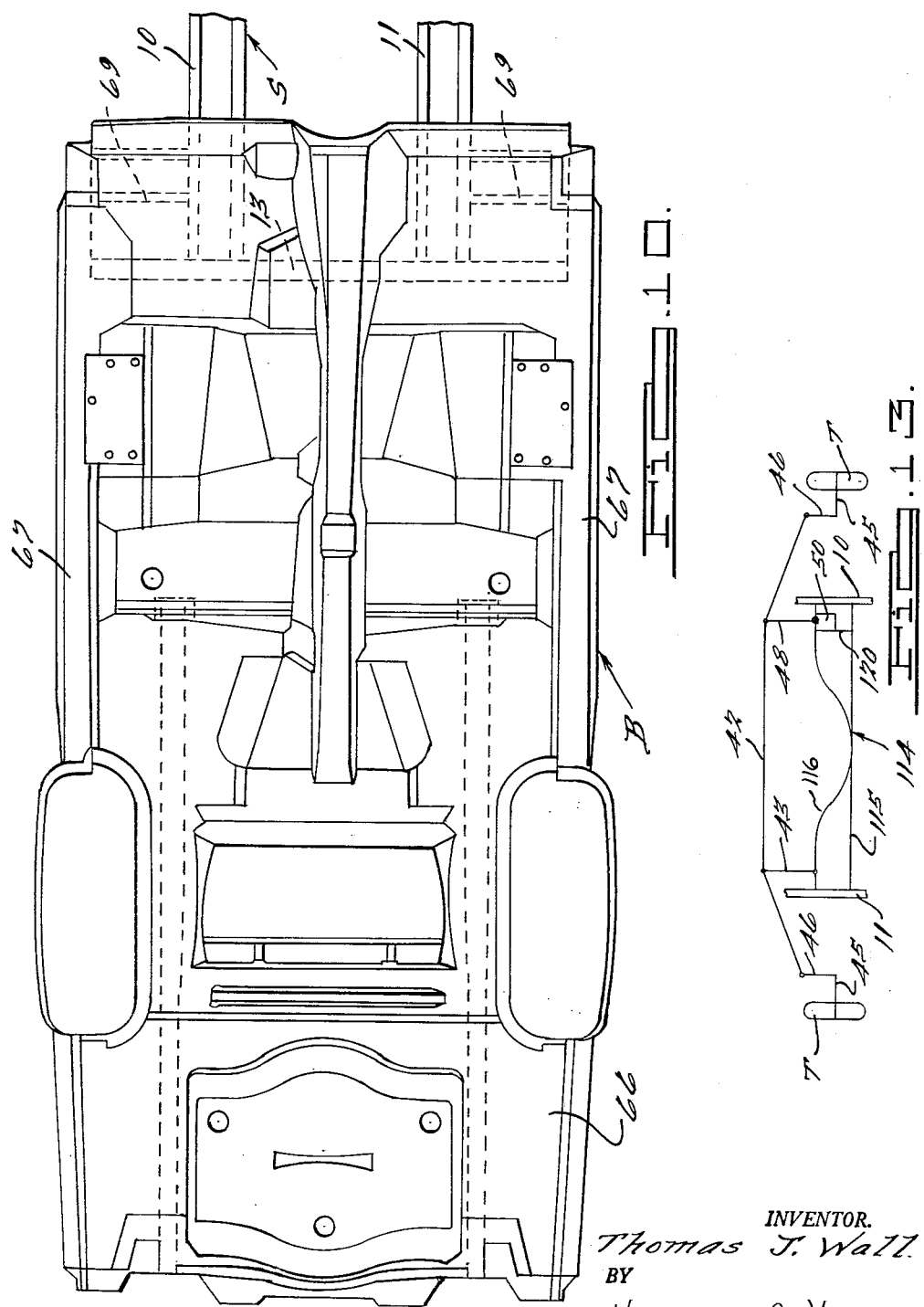

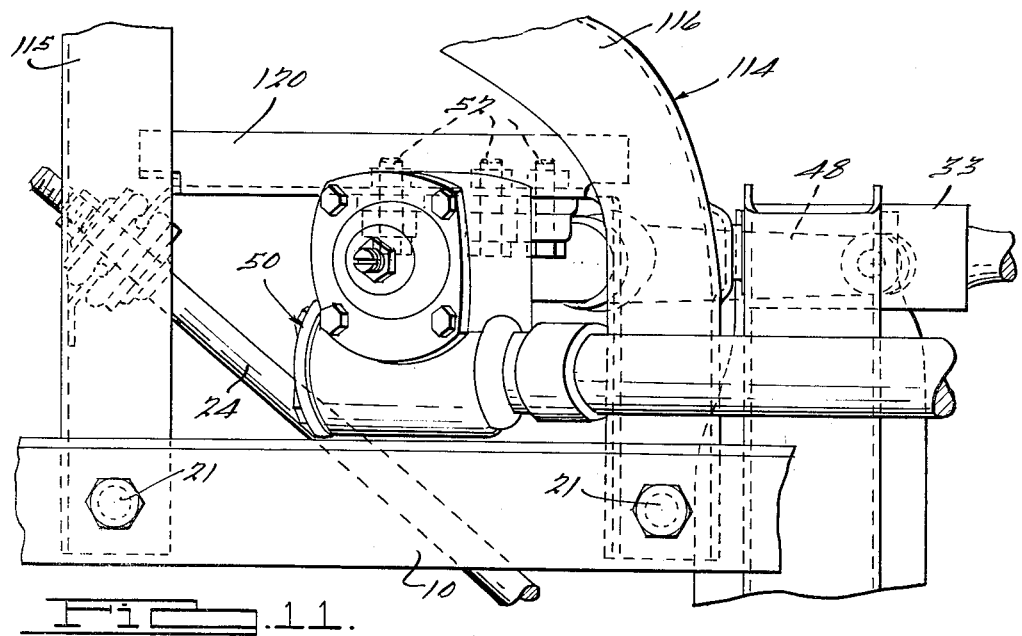
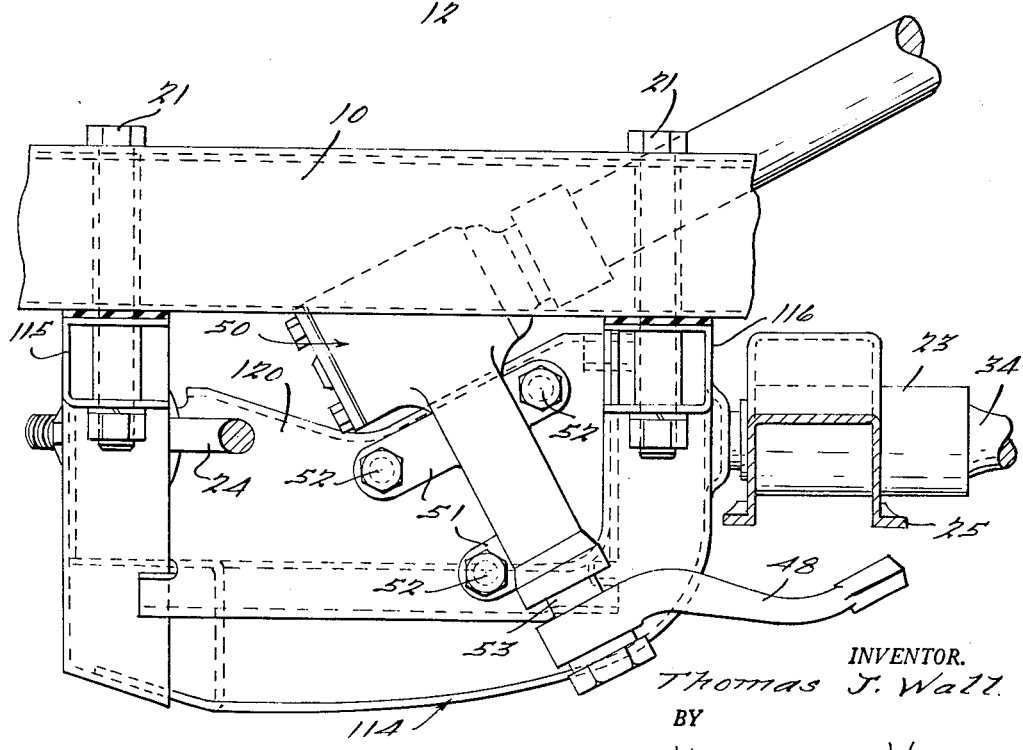

This invention relates to the front end frame structure of a motor vehicle that is adapted to support, as a subassembly, the vehicle engine, the front wheel suspension, and the steering linkage associated with the front wheel suspension.

It is a prime object of this invention to provide a cross member at the front end of a motor vehicle chassis frame or stub frame which cross member can be utilized as a mounting base on which to build up a sub-assembly comprising the vehicle engine, the front wheel suspension, and the associated steering linkage such that a unitized vehicle body having a forwardly projecting integral frame element can be preassembled along one assembly line and a novel frame cross member with the front end power plant, wheel suspension and steering linkage assembled on a second assembly line with the two separate vehicle assemblies subsequently joined in a quick, simple, efficient manner to thereby reduce the cost of vehicle building and provide structure that lends itself to economical replacement or repair of the basic elements of a motor vehicle front end running gear. At the same time the assembly of the front end power plant, running gear and steering linkage on a single cross member gives an accurately aligned assembly that improves vehicle performance and reduces parts wear that results from misalignment of connected elements.

It is another object of this invention to provide a vehicle frame cross member of novel shape and arrangement such that the running gear and power plant elements arranged at the forward end of the vehicle may be readily preassembled on the cross member.

It is still another object of this invention to provide a detachable frame structure cross member that is adapted to support an improved type of front wheel ball joint suspension and steering knuckle mechanism.

It is still another object of this invention to provide a two-piece ball joint suspended steering knuckle that provides for an improved arrangement of the ball joints and associated steering elements of a steerable front wheel suspension.

It is still another object of this invention to provide a vehicle stub frame that is arranged to cooperate with a novel type of engine supporting cross member and the associated sheet metal and rigidifying frame members at the forward end of a unitized vehicle body whereby improved strength and body tightness may be achieved as well as improved accessibility of parts for repair and/or replacement of the vehicle power plant and front end running gear.

It is still another object of this invention to provide an improved type of frame cross member that supports a power plant front end, a front wheel suspension assembly and the front wheel steering linkage including the steering gear pitman arm and wheel connecting tie rod linkage.

Other objects and advantages of this invention will become readily apparent from a reading of the following description and a consideration of the related drawings wherein:

FIG. 1 is a perspective view of a stub frame structure projecting from the forward end of a motor vehicle body which stub frame structure embodies this invention;

FIG. 2 is a top plan elevation of the frame cross member shown in FIG. 1 which frame cross member includes this invention;

FIG. 3 is a rear end elevation of the frame cross member shown in FIG. 2, the view being taken looking in the direction of the arrow 3 of FIG. 2;

FIG. 4 is a side elevation of the frame cross member shown in FIG. 2, the view being taken looking in the direction of the arrow 4 of FIG. 2;

FIG. 5 is an enlarged, fragmentary, sectional elevational view taken along the line 5—5 of FIG. 2;

FIG. 6 is a fragmentary front end elevation of the front wheel suspension mechanism disclosed in FIG. 1, the view including in addition a vehicle wheel assembly which was omitted in FIG. 1 for the sake of clarity;

FIG. 7 is an enlarged fragmentary side elevational view of the steering knuckle associated with the steerable front wheel shown in FIG. 6, the view being taken looking in the direction of the arrow 7 of FIG. 6;

FIG. 8 is an enlarged fragmentary sectional elevational view of the lower ball joint shown in FIG. 7, the view being taken along the line 8—8 of FIG. 7;

FIG. 9 is an enlarged fragmentary sectional elevational view of the upper ball joint assembly for the front wheel suspension, the view being taken along the line 9—9 of FIG. 6;

FIG. 10 is a top plan elevation of the vehicle body floor pan and associated stub frame at the forward end thereof adapted for use with a vehicle body frame embodying this invention;

FIG. 11 is a fragmentary top plan elevational view of a modified form of frame cross member; and FIG. 12 is a side elevational view of the construction shown in FIG. 11, the view being taken looking in the direction of the arrow 12 of FIG. 11; and FIG. 13 is a diagrammatic view of the tie rod linkage used with each of the forms of this invention shown.

FIG. 1 shows a stub frame assembly S that includes side rails 10, 11 that are connected at the front ends by an integral cross member 12, at the rear ends by an integral cross member 13, and intermediate their ends, but in the forward area thereof, by a frame cross member 14 that is detachably mounted on the side rails as at 21 by rubber insulated bolted connections. The cross member 14 is of substantially K-shape in plan configuration and comprises the forward leg 15 and the rear leg 16 with the pair of legs being joined centrally of their lengths as indicated at 17, 18. The frame 14 can be other than K-shaped in plan configuration provided the legs 15, 16 provide bifurcated ends. The free ends of each of the leg elements 16, 17 of the K-member 14 are provided with bolt receiving apertures 20 that are arranged to provide means for the detachable connection of the K frame to the lower side of the side rails 10, 11 by means of a sound insulated bolt and nut connector such as the element 21 shown in FIGS. 1 and 6. The K-member 14 has the ends of its front leg 15 provided with a pair of apertured seats 23 that are adapted to receive the threaded ends of the thrust rods 24 associated with the lower control arms 25 of the front wheel suspension mechanism. Thrust rods 24 are shown and described in detail in the copending application of John E. Collier et al. Serial No. 666,293, filed June 18, 1957.

The rear leg member 16 of the cross member frame 14 provides the support member for a number of different elements of the vehicle running gear including the engine, the front wheel suspension and the steering mechanism. It will be noted that the rear leg member 16 is pierced by thimble type bushings 31 adjacent each end which bushings provide the seats for cantilever-type pivot pins 32 that pivotally support the lower control arms 25 of the front wheel suspension mechanism (see FIGS. 2 and 5). The lower control arms 25 are each journalled on one of the pivot pins 32 (see FIGS. 2 and 5) by means of a sleeve 33 that is rotatably mounted on the associated arm 25. Sleeve 33 is non-rotatably connected to the front end of the associated torsion bar element 34 (see FIG. 5). A torsion bar stress adjusting means 90 extends between sleeve 33 and control arm 25. This specific type of pivot pin connection 32, 33 and stress adjusting means 90 that is utilized for connecting the lower control arms 25 to the pivot pins 32 is clearly described and claimed in the copending application of Maurice D. Karlstad Serial No. 828,486, filed July 21, 1959, and forms no part of this invention. The rear ends of the wheel supporting torsion bar elements 34 (only one shown in FIG. 1) are non-rotatably connected to the frame rear cross member 13 of the stub frame S by means of an anchor sleeve 35 that is welded or otherwise suitably fixed in the cross member 13.

In addition to providing the pivot support means for the lower control arms 25, the rear leg 16 of the K-frame 14 also mounts a pair of transversely spaced apart front engine mount brackets 36 and 37, respectively. The front engine mounts 36 and 37, in the disclosed arrangement, are not identical due to the fact that the engine that is mounted thereon is intended to be supported at an angle to the vertical and thus different types of mounts are used on opposite sides of the K-frame leg member 16. However, if a symmetrically arranged engine were to be utilized with the K-frame 14 then it would be possible to use identical front engine mounts on the opposite ends of the K-frame leg member 16.

The rear leg 16 of the K-frame member 14 is also formed with a rearwardly projecting bracket 40 that is pierced by a pair of apertures 41 that are adapted to receive a pin 44 to pivotally seat and provide a journal for the pivoted arm 43 of the steering mechanism tie rod linkage 42. Tie rod linkage 42 (see FIG. 13), includes a center link and a pair of end links connected to the wheel steering knuckles 45. Linkage 42 is adapted to be connected to each of the wheels T through steering knuckles 45 that have suitable knuckle arms 46 (see FIG. 7). The steering linkage 42 (see FIG. 1) is adapted to be actuated by a pitman arm 48 that is a driven part of the steering gear 50. Gear 50 may be detachably connected to the side rail 10 of the stub frame S as shown at 51 in FIG. 1 or, in the alternative, carried by the K-frame 114 as shown in FIGS. 11 and 12.

From the foregoing description it is thought to be obvious that the K-member 14 provides a base frame for a sub-assembly that has preassembled thereon an engine unit (not shown) that is supported at its front end by the front engine mounts 36, 37. In addition, the front wheel suspension lower control arm 25 with the associated wheel knuckles 45 and steering linkage 42 are readily mounted on the K-frame 14 prior to fixation of the K-frame on the stub frame S. Likewise, the lower control arm pivot pins 32, that support the torsion bar sleeves 33, are arranged to be readily connected to the front ends of the torsion bars 34 when the K-frame 14 is finally bolted to the stub frame side rails 10 of the associated vehicle body B.

As can be seen from FIG. 1, the stub frame side rails 10, 11 are formed at the forward ends with a pair of seats 55 and are adapted to receive and support an engine radiator (not shown) that might be required if a water cooled engine is to be utilized with the associated K-frame member 14. The rear cross rail 13 of the stub frame S is formed at its mid-section with a kick-up 56 to provide a tunnel formation to receive the forward end of a drive shaft (not shown). Detachably bolted to the center section of the rear cross rail 13, beneath the tunnel kick-up 56, is an intermediate cross rail member 57. The intermediate cross rail member 57 is connected to the rear cross member 13 by bolt connectors 58. Mounted on the intermediate cross rail 57 is a rear engine mount support plate 59 that is adapted to cooperate with the front engine mounts 36, 37 of the K-frame member 14 to provide a 3 point suspension for the motor vehicle engine to be mounted on the member 14. With the detachable rail member 57 it is possible to drop the rear engine mount 59 and thus readily remove the engine and associated transmission units (not shown) if such should be required for repair or replacement.

Mounted on the top side of the stub frame side rails 10 and 11, above the lower control arms 25, are upstanding frame brackets 61. Frame brackets 61 provide a support for the front engine sheet metal 62 on the stub frame S (see FIG. 1) and in addition the frame brackets 61 provide anchors for the upper ends of the shock absorber elements 68 that have their lower ends connected to the lower control arms 25. Additional support bracing for the front end sheet metal 62 on the stub frame S is provided by the framework 64 that is supported by the front cross member 12 of the stub frame S. The rear end edge portions of the front end sheet metal 62 are welded as indicated at 65, or otherwise rigidly connected to the fire wall W of the vehicle body B that is associated with the stub frame S. As can be seen from FIG. 10, the vehicle body B includes a floor pan 66 that has side sills 67 extending forwardly beyond the stub frame rear cross rail 13. From FIGS. 1 and 10 it is thought to be obvious that the front ends of the vehicle body side sills 67 are connected to the stub frame side rails 10, 11 by inwardly extending connector rails 69 that assist in providing a rigid connection of the stub frame S to the vehicle body B at its forward end.

Also mounted on the upper sides of the stub frame rails 10, 11 on opposite sides of the upstanding frame brackets 61, are upstanding bracket elements 71. These bracket elements 71 provide the pivot supports for the inner ends of the substantially V-shaped, upper, wheel supporting, control arms 72. The pivot connection between the inner ends of the upper control arms 72 and the upstanding support brackets 71 is described in detail in the copending application of R. H. Kushler et al. Serial No. 753,037 filed August 4, 1958 and now Patent No. 2,954,998. The particular type of pivot connection used on the upper control arms 72 is not a part of this invention and, therefore, it will not be described in detail.

Connected between the outer ends of the upper control arms 72 and the lower control arms 25 at each side of the vehicle is a steering knuckle 45. The connection of the upper and lower ends of the steering knuckle 45 to the upper and lower control arms is by means of ball joint assemblies which are shown in detail in FIGS. 9 and 8, respectively. The upper ball joint assembly (FIG. 9) includes a housing 74 that is threadably connected to the upper control arm 72. Within the housing 74 is a rockable stud 75 that is journalled in the housing 74 by means of a bearing element 76. The lower end of the stud 75 is connected to the upper end of the steering knuckle assembly 45 by the nut 77. FIG. 8 shows the lower ball joint assembly wherein a stud 80 is connected to the lower control arm 25 by means of a nut 81. The lower end of the stud 80 mounts a bearing ring 82 of the compression type that seats on the inner bearing surface of a housing element 83 that is threadably mounted in a bore in the steering knuckle arm 46. Steering knuckle arm 46 is detachably connected to the steering knuckle 45 by means of the bolt and nut connectors 86. The two-piece steering knuckle arm assembly 45, 46 lends itself to ready manufacture and it also facilitates replacement of the lower control arm ball joint assembly 80—83. With the particular two-piece steering knuckle and arm assembly 45, 46 it is thought to be obvious that such an arrangement permits the sub-assembly of the front wheel suspension on the K-frame engine support 14 so that the vehicle front end power train and running gear may be built up as a sub-assembly and thereafter added to the vehicle body B after complete build-up of the vehicle body B.

FIGS. 11 and 12 show a modified form of this invention wherein the K-frame 114 not only includes all of the structure shown in the FIGS. 2-4 form, but in addition the K-frame 114 includes a mounting plate or bracket 120 that extends between the front and rear legs 115, 116 of the K-frame 114 at the left end thereof adjacent the stub frame side rail 10. The mounting plate 120 is adapted to provide the support for the steering gear mechanism 50. Mechanism 50 is shown as mounted on the stub frame side rail 10 in the FIGS. 1-10 form of this invention. In the FIGS. 11 and 12 form of this invention, by the addition of the mounting plate 120 to the K-frame 114, it is possible to have all of the steering mechanism 40—50 carried by the K-frame 114 and this is advantageous as it supports the complete tie rod linkage 42 including both pivot arms 43, 48 on the same frame 114 (see FIG. 13). Adjustment of the steering is facilitated by this arrangement and it also simplifies removal of the K-member as the steering gear 50, as well as the tie rod linkage 42, are each carried by the frame 114.

The steering gear 50, in FIGS. 11 and 12, has a housing that includes bolt supporting ears 51 that are arranged to seat on the mounting bracket 120 and be fixedly connected thereto by the bolts 52. The steering gear 50 (see FIG. 12) includes a cross shaft 53 that is drivingly connected to the pitman arm 48 in any conventional manner. All of the advantages claimed for the FIGS. 1-10 form of this invention are inherent in the form of the invention shown in FIGS. 11-13.

From the foregoing description of this invention, it is thought to be clear that the vehicle body B can be preassembled as unitized body with a forwardly projecting stub frame S integral with the body B. This unitary body and frame assembly can be preassembled on an assembly line at the same time that the power plant and front running gear assembly is being built up on a second assembly line. The power plant and front running gear sub-assembly uses the K-frame member 14 as the base plate or frame for this preassembly. The base frame 14 can have the front portion of the vehicle engine connected to the front engine mounts 36, 37 by a relatively simple operation due to the fact that the frame 14 at this time is disassociated from the vehicle body B. Likewise, the wheel supporting lower control arms 25, 25 can be attached to the base frame leg 16 at opposite ends thereof by means of the cantilever type pivot pin connections 32, 32 which seat in the frame journals 31, 31. The control arms 25, 25 that are mounted on the base frame 14 mount the steering knuckle assemblies 45, 45 which are connected to the lower control arms 25, 25 by means of the lower ball joint connections 80—83. The steering knuckle assemblies 45, 45 each have pivotally connected to their upper ends the upper control arms 72, 72 by means of the upper ball joint assemblies 74—77. As the upper control arms 72, 72 are carried by the steering knuckle assemblies 45, 45 it is thought to be apparent that it will be a simple operation to pivotally connect the inner free ends of the upper control arms 72 to the stub frame supported upstanding brackets 71, 71 when the K-member 14 and its several subassemblies are finally joined to the stub frame S of the vehicle body B. The shock absorber elements 62 that are preassembled on the lower control arms 25 have the upper ends joined to the upstanding bracket 61 of the stub frame S at the same time that the upper control arms 72 are connected to the stub frame supported brackets 71.

Prior to mounting of the K-frame supported subassemblies on the stub frame S the wheel connecting tie rod linkage 42 has been connected to the pivot link support bracket 40 of the K-frame 14 and interconnected with the steering knuckle lever arms 46, 46. If the steering gear element 50 is mounted on the stub frame S, as shown in FIG. 1, then the steering gear pitman arm 48 is connected to the tie rod linkage 42 after mounting of the K-frame subassembly on the stub frame S. However, if the steering gear assembly 50 is carried by the stub frame bracket plate 120, as shown in FIGS. 11 through 13, then the tie rod linkage 42 is connected to the steering gear pitman arm 48 during build-up of the K-frame subassembly and in this case the steering linkage 42, 43 and steering gear 48, 50 are a completely assembled unit on the K-frame 14 prior to connection of the K-frame 14 to the stub frame S.

During mounting of the K-frame 14 on the stub frame S the torsion bars 34 are connected between the control arm pivot sleeves 33 and the rear cross rail anchor sleeves 35. Likewise, at this same time the rear end portion of the engine (not shown) can be connected to the rear engine mount 59 that is carried by the detachable intermediate rail portion 57 of the rear cross rail 13 of stub frame S.

By the foregoing procedure it is thought to be obvious that a very simple assembly operation is required to mount the K-frame supported power plant and running gear sub-assembly on the preassembled vehicle body B and stub frame S when the K-frame is constructed in accordance with this invention.

I claim:

1. In a motor vehicle having a pair of transversely spaced, longitudinally extending, side rails, a frame cross member extending transversely between and detachably and rigidly connected to said side rails having means thereon to support an engine, a pair of transversely spaced, vertically swingable, wheel supporting control arms located at opposite ends of said cross member and oscillatable tie rod linkage for interconnecting the wheel assemblies mounted on said cross member and extending between said control arms, said frame cross member comprising a pair of bifurcated end portions at opposite ends thereof, providing front and rear leg portions at each end of the cross member, said leg portions each including means for detachable connection to said side rails, one transversely aligned pair of leg portions including a pair of spaced front engine mounts, and a pair of longitudinally extending, spaced, pivot pins for journalling the wheel supporting control arms and the other transversely aligned pair of leg portions including seats for thrust links connected to said control arms.

2. In a motor vehicle having a pair of transversely spaced, longitudinally extending, side rails, a frame cross member extending transversely between and detachably and rigidly connected to said side rails having means thereon to support an engine, a pair of transversely spaced, upper and lower, vertically swingable, wheel supporting control arms at each end of said frame cross member and oscillatable tie rod linkage for interconnecting the wheel assemblies mounted on said cross member and extending between said control arms, said frame cross member comprising a pair of bifurcated end portions at opposite ends thereof, providing front and rear leg portions at each end of the cross member, said leg portions each including means for detachable connection to said side rails, one transversely aligned pair of leg portions including a pair of spaced front engine mounts, a pair of longitudinally extending, spaced, pivot pins for journalling the wheel supporting lower control arms, and pivotally mounted support means for the wheel connecting tie rod linkage, the other pair of transversely aligned cross member leg portions including seats for mounting thrust links connected to said lower control arms.

3. In a motor vehicle having a pair of transversely spaced, longitudinally extending, side rails, a frame cross member extending transversely between and detachably connected to said side rails having means thereon to support an engine, a pair of transversely spaced, upper and lower, vertically swingable, wheel supporting control arms at each end of said frame cross member and oscillatable tie rod linkage for interconnecting the wheel assemblies mounted on said cross member and extending between said control arms, said frame cross member comprising a pair of bifurcated end portions at opposite ends thereof, providing front and rear leg portions at each end of the cross member, said leg portions each including means for detachable connection to said side rails, one transversely aligned pair of leg portions including a pair of spaced front engine mounts, a pair of longitudinally extending, spaced, pivot pins for journalling the wheel supporting lower control arms, pivotally mounted support means for the wheel connecting tie rod linkage, the other pair of transversely aligned cross member leg portions including seats for mounting thrust links connected to said lower control arms and means rigidly mounting a steering gear assembly on said frame cross member having means connected to and controlling movement of said tie rod linkage.

4. In a motor vehicle having a pair of transversely spaced, longitudinally extending, side rails, a frame cross member extending transversely between and detachably connected to said side rails having means thereon to support an engine, a pair of transversely spaced, upper and lower, vertically swingable, wheel supporting control arms at each end of said frame cross member and oscillatable tie rod linkage for interconnecting the wheel assemblies mounted on said cross member and extending between said control arms, said frame cross member comprising a pair of bifurcated end portions at opposite ends thereof, providing front and rear leg portions at each end of the cross member, said leg portions each including means for detachable connection to said side rails, one transversely aligned pair of leg portions including a pair of spaced front engine mounts, a pair of longitudinally extending, spaced, pivot pins for journalling the wheel supporting lower control arms, pivotally mounted support means for the wheel connecting tie rod linkage, the other pair of transversely aligned cross member leg portions including seats for mounting thrust links connected to said lower control arms and means rigidly mounting a steering gear assembly on said frame cross member having means connected to and controlling movement of said tie rod linkage, said wheel supporting lower control arms each mounting an upstanding steering knuckle to provide for steering movement of the associated wheel assemblies.

5. In a motor vehicle having a pair of transversely spaced, longitudinally extending, side rails, a frame cross member extending transversely between and detachably connected to said side rails having means thereon to support an engine, a pair of transversely spaced, upper and lower, vertically swingable, wheel supporting control arms at each end of said frame cross member and oscillatable tie rod linkage for interconnecting the wheel assemblies mounted on said cross member and extending between said control arms, said frame cross member comprising a pair of bifurcated end portions at opposite ends thereof, providing front and rear leg portions at each end of the cross member, said leg portions each including means for detachable connection to said side rails, one transversely aligned pair of leg portions including a pair of spaced front engine mounts, a pair of longitudinally extending, spaced, pivot pins for journalling the wheel supporting lower control arms, pivotally mounted support means for the wheel connecting tie rod linkage, the other pair of transversely aligned cross member leg portions including seats for mounting thrust links connected to said lower control arms and means rigidly mounting a steering gear assembly on said frame cross member having means connected to and controlling movement of said tie rod linkage, said wheel supporting lower control arms each mounting an upstanding steering knuckle to provide for steering movement of the associated wheel assemblies with said steering knuckle assemblies each including an upper control arm pivotally connected thereto and adapted to be pivotally connected to a frame side wall for vertically swingable movement of the knuckle connected control arms.

6. In a motor vehicle having a pair of transversely spaced, longitudinally extending, side rails, a K-shaped frame cross member extending transversely between and detachably connected to said side rails having means thereon to support an engine, a pair of transversely spaced, upper and lower, vertically swingable, wheel supporting control arms at each end of said cross member and oscillatable tie rod linkage for interconnecting the wheel assemblies mounted on said cross member and extending between said control arms, said frame cross member comprising a pair of bifurcated end portions at opposite ends thereof, providing front and rear leg portions at each side of the cross member, said leg portions each including means for detachable connection to said side rails, one transversely aligned pair of leg portions including a pair of spaced front engine mounts, a pair of longitudinally extending spaced, pivot pins for journalling the wheel supporting lower control arms, pivotally mounted support means for the wheel connecting tie rod linkage, the other pair of transversely aligned cross member leg portions including seats for mounting thrust links connected to said lower control arms and means rigidly mounting a steering gear assembly on said frame cross member having means connected to and controlling movement of said tie rod linkage, said wheel supporting lower control arms each mounting an upstanding steering knuckle to provide for steering movement of the associated wheel assemblies with said steering knuckle assemblies each including an upper control arm pivotally connected thereto and adapted to be pivotally connected to a frame side rail for vertically swingable movement of the knuckle connected control arms, said steering knuckle assemblies each comprising a wheel spindle supporting portion and a detachable knuckle arm portion arranged for pivotal connection to said tie rod linkage, said knuckle arms each seating a ball joint assembly that provides a pivotal connection with the associated lower control arm.

7. In a motor vehicle having a pair of transversely spaced, longitudinally extending, side rails, a K-shaped frame cross member extending transversely between and detachably connected to said side rails having means thereon to support an engine, a pair of transversely spaced, upper and lower, vertically swingable, wheel supporting control arms and oscillatable tie rod linkage for interconnecting the wheel assemblies mounted on said cross member and extending between said control arms, said frame cross member comprising a pair of bifurcated end portions at opposite ends thereof, providing front and rear leg portions at each side of the cross member, said leg portions each including means for detachable connection to said side rails, one transversely aligned pair of leg portions including a pair of spaced front engine mounts, a pair of longitudinally extending, spaced, pivot pins for journalling the wheel supporting lower control arms, and pivotally mounted support means for the wheel connecting tie rod linkage, said other pair of transversely aligned cross member leg portions including seats for thrust rod elements connected to lower control arms.

8. A motor vehicle comprising a unitized body including integrally connected body side sills, floor pan and front fire wall with an integral stub frame projecting forwardly from the body fire wall at approximately the level of the body side sills, said stub frame including a rear cross rail connected to the underside of said floor pan and extending between and connected to said side rails, said rear cross rail including an upwardly arched center section and a detachable intermediate rail section extending across the bottom of said upwardly arched center section and mounting a rear engine mount, longitudinally extending side rails on said stub frame spaced inwardly of and connected to said side sills, a K-shaped frame cross member having bifurcated ends extending transversely of and connected to said side rails adjacent the forward ends thereof, said frame cross member providing a unitary sub-assembly wherein one pair of transversely aligned ends mounts transversely spaced front engine mounts, transversely spaced lower control arm pivotal supports and tie rod linkage support means, the other pair of transversely aligned ends including mounts for thrust links connectible to the lower control arms, sheet metal supporting framework at the front end of said stub frame, and body front end sheet metal extending between and integrally connected to the body fire wall, the stub frame side rails and the framework at the front end of the stub frame.

9. A motor vehicle comprising a unitized body including integrally connected body side sills, floor pan and front fire wall with an integral stub frame projecting forwardly from the body fire wall at approximately the level of the body side sills, said stub frame including a rear cross rail connected to the underside of said floor pan and extending between and connected to said side rails, said rear cross rail including an upwardly arched center section and a detachable intermediate rail section extending across the bottom of said upwardly arched center section and mounting a rear engine mount, longitudinally extending side rails on said stub frame spaced inwardly of and connected to said side sills, a K-shaped frame cross member having bifurcated ends extending transversely of and connected to said side rails adjacent the forward ends thereof, said frame cross member providing a unitary sub-assembly wherein one pair of transversely aligned ends mounts transversely spaced front engine mounts, transversely spaced lower control arm pivotal supports and tie rod linkage support means, the other pair of transversely aligned ends mounting thrust rod seats for said lower control arms, sheet metal supporting framework at the front end of said stub frame, and body front end sheet metal extending between and integrally connected to the body fire wall, the stub frame side rails and the framework at the front end of the stub frame, said stub frame side rails including upper control arm pivotal supports.

10. A motor vehicle comprising a unitized body including integrally connected body side sills, floor pan and front fire wall with an integral stub frame projecting forwardly from the body fire wall at approximately the level of the body side sills, said stub frame including a rear cross rail connected to the underside of said floor pan and extending between and connected to said side sills, said rear cross rail including an upwardly arched center section and a detachable intermediate rail section extending across the bottom of said upwardly arched center section and mounting a rear engine mount, longitudinally extending side rails on said stub frame spaced inwardly of and connected to said side sills, a frame cross member of substantially K-shape having bifurcated ends extending transversely of and connected to said side rails adjacent the forward ends thereof, said frame cross member providing a unitary sub-assembly with one pair of transversely aligned ends that mount transversely spaced front engine mounts, transversely spaced lower control arm pivotal supports and tie rod linkage pivotal support means, the other pair of transversely aligned ends mounting thrust rod seats for said lower control arms, sheet metal supporting framework at the front end of said stub frame, and body front end sheet metal extending between and integrally connected to the body fire wall, the stub frame side rails and the framework at the front end of the stub frame, said stub frame cross member including means mounting a steering gear unit that is adapted to be connected to and to control movement of the tie rod linkage to be associated with the frame cross member.

11. In a motor vehicle, a frame cross member adapted to be detachably connected to a pair of transversely spaced, longitudinally extending, frame side rails comprising front and rear leg members having interconnected intermediate portions and spaced end portions, spaced engine mounting brackets carried by the end portions of one transversely aligned pair of said leg members, control arm pivot pin means mounted in the end portions of said one transversely aligned pair of said leg members, thrust link seats carried by the end portions of the other transversely aligned pair of leg members and bracket means projecting from at least one leg member providing pivotal support means for a wheel connecting tie rod linkage.

References Cited in the file of this patent

UNITED STATES PATENTS

| | | |
|---|---|---|
| 2,461,775 | Roos | Feb. 15, 1949 |
| 2,607,610 | Allison | Aug. 19, 1952 |
| 2,696,388 | Kishline | Dec. 7, 1954 |
| 2,751,992 | Nallinger | June 26, 1956 |
| 2,871,025 | Neher | Jan. 27, 1959 |
| 2,913,268 | Booth | Nov. 17, 1959 |

UNITED STATES PATENT OFFICE
CERTIFICATE OF CORRECTION

Patent No. 2,997,313                                August 22, 1961

Thomas J. Wall

It is hereby certified that error appears in the above numbered patent requiring correction and that the said Letters Patent should read as corrected below.

Column 3, line 52, for "arm" read -- arms --; column 4, lines 38 and 39, for "ccopending" read -- copending --; column 5, line 31, after "as" insert -- a --; line 62, for "bracket" read -- brackets --; column 6, line 60, after "linkage" strike out the comma; column 7, line 71, for "wall" read -- rail --; column 8, line 15, after "extending" insert a comma.

Signed and sealed this 23rd day of January 1962.

(SEAL)
Attest:

ERNEST W. SWIDER
Attesting Officer

DAVID L. LADD
Commissioner of Patents